Feb. 22, 1966   H. HALSEY   3,236,260
SELECTOR VALVE

Filed June 29, 1962   3 Sheets-Sheet 1

Inventor:
Herbert Halsey
By: Stevens, Davis, Miller & Mosher
Attorneys

Feb. 22, 1966 H. HALSEY 3,236,260
SELECTOR VALVE
Filed June 29, 1962 3 Sheets-Sheet 3

Inventor:
Herbert Halsey
By Stevens, Davis, Miller & Mosher
Attorneys

United States Patent Office 3,236,260
Patented Feb. 22, 1966

3,236,260
SELECTOR VALVE
Herbert Halsey, Whetstone, England, assignor to The English Electric Company Limited, Whetstone, England
Filed June 29, 1962, Ser. No. 206,234
Claims priority, application Great Britain, July 5, 1961, 24,228/61
11 Claims. (Cl. 137—624.18)

The present invention relates to a selector valve which is operable for connecting a selected one of a number of inlet ports to an outlet port.

A selector valve in accordance with the present invention is particularly suited for use in a nuclear reactor where it is desirable to achieve and maintain a high degree of fluid tight sealing of the apparatus and where it is necessary that much of the apparatus be operated by remote control.

According to the invention a selector valve for connecting any one of a number of inlet ports to an outlet port for selecting a desired flow path, includes driving means for operating the valve to select a desired flow path operable in response to the application of fluid under pressure to the outlet port.

According to one feature of the invention the selector valve includes a cylindrical housing having a number of radially-disposed inlet ports and an axially-disposed outlet port, a rotor member within the housing for connecting the outlet port to a selected one of the inlet ports, the rotor member being arranged for axial movement within the housing in response to the application of fluid under pressure to the outlet port, and the driving means being arranged to impart a rotary movement to the rotor in response to axial movement thereof.

According to another feature of the invention the rotor member has a passage therein which connects with the outlet port and the selected inlet port and has a non-return valve in the passage arranged to close upon the application of fluid under pressure to the outlet port whereby further pressure causes axial movement of the rotor.

According to another feature of the invention the driving means is enclosed within the cylindrical housing.

According to a further feature of the invention one end of the rotor member is normally positioned adjacent one end of the cylindrical housing and the other end of the rotor carries a crown of teeth, and the driving means comprises a cylindrical sleeve having a crown of teeth co-operating with the rotor teeth and mounted for limited rotary movement in response to axial movement thereof, whereby axial movement of the rotor causes axial and rotary movement of the sleeve which thus imparts rotary movement to the rotor, the driving means also including biasing means for returning the rotor to its said normal position and locking means for locking the rotor in such position after it has been rotated one tooth pitch.

According to another aspect of the invention a nuclear reactor includes a selector valve as described above.

One form of selector valve suitable for use with a burst can detector gear of a nuclear reactor will be described, by way of example, in relation to the accompanying drawings in which.

Figure 1:
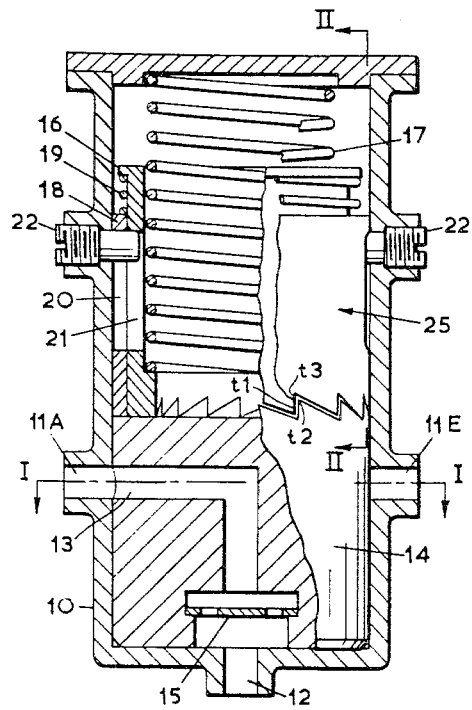
FIG. 1 is a section through a selector valve in accordance with the invention.
Figure 2:
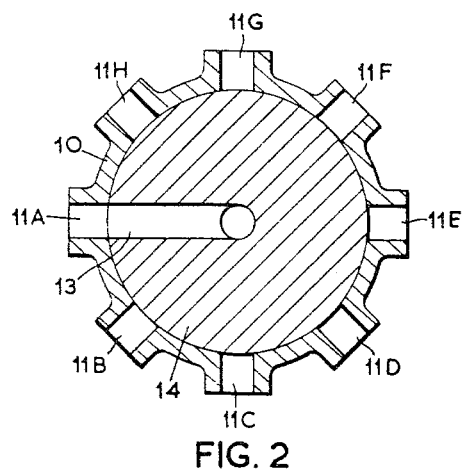
FIG. 2 is a section through the valve shown in FIG. 1 on line I—I thereof.

In FIGS. 1 and 2 the valve is shown as comprising a casing 10 having therein eight inlet ports 11A to 11H and a single outlet port 12.

The valve has a rotor 14 formed with a passageway 13 which can be indexed to eight different positions to connect any of the inlet ports 11A to 11H to the outlet port 12.

In use with a nuclear reactor the various inlet ports are connected to fuel channels of the nuclear reactor and gas samples taken from the channels through the outlet port 12 whereby the gas can be led to a detector for detecting the presence of any radioactive particles in the gas.

In passing through the passageway 13 the gas passes through a non-return valve 15 which if subject to fluid flow in the reverse direction closes the passage from the outlet port 12 to the inlet ports 11A to 11H.

In operating the valve, gas, under pressure, is fed to the outlet port 12 to close the non-return valve and to operate a drive mechanism generally indicated at 25.

The drive mechanism comprises a driving sleeve 16 which is forced downwardly by a compression spring 17 so that a crown of teeth provided on the bottom of the driving sleeve as, for example, shown at t1 mesh with a corresponding crown of teeth provided on the top of the rotor 14, as shown at t2. The number of teeth provided is either equal to the number of inlet ports 11A to 11H or is a multiple thereof.

Surrounding the driving sleeve 16 is a locking sleeve 18 which is forced downwardly under pressure of a compression spring 19 which is disposed between the top of sleeve 18 and a rim on the top of the driving sleeve 16.

The bottom of the locking sleeve is also provided with a crown of teeth as may be seen at t3 in FIG. 1 and FIGS. 2A to 2D.

The locking sleeve 18 has therein two slots 20 and the driving sleeve 16 also has therein two slots 21 as may best be seen in FIGS. 2A to 2F, and these latter slots are so shaped as to co-operate with respective pins 22 secured in the casing 10 of the valve to effect rotation of the valve.

Figure 2A:
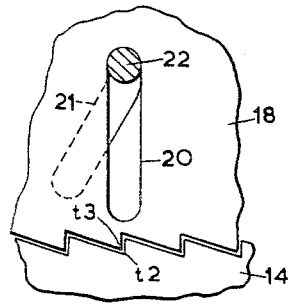
FIGS. 2A to 2F show various stages in the operation of the valve as parts of the valve appear on line II—II of FIG. 1 during these various stages of operation.
Figure 2B:
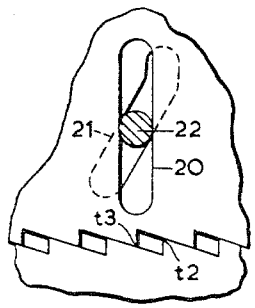

In operation, gas under pressure is fed to the outlet port 12 and thus causes the non-return valve 15 to close whereupon the fluid pressure is applied to the rotor which thus moves axially. At the commencement of the axial movement of the rotor the location of the drive sleeve slots 21, the locking sleeve slots 20, and the teeth is as shown in FIG. 2A but as the rotor moves upward it is turned as shown in FIG. 2B with the tooth t2 travelling to the right, driven by the teeth on the driving sleeve 16 which is caused to turn by the slot and pin arrangement 21 and 22.

Figure 2C:
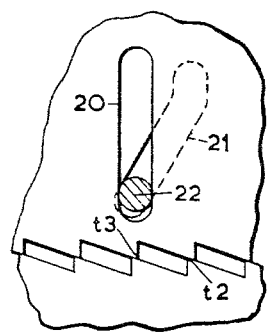
Figure 2D:
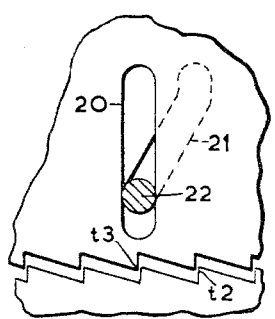

FIGS. 2C and 2D show further steps in the turning of the drive sleeve and rotor to the right, FIG. 2D showing the condition when the drive sleeve has reached its limit of travel and has driven the rotor 14 to the point at which the tooth t1 (unshown in FIG. 2D), has moved the same amount as tooth t2 whereas the tooth t3 has merely been lifted to allow the rotor to rotate and has commenced to return to its lower position, and as shown in FIG. 2D, cause locking of the rotor 14 in its new position, turned one tooth pitch to the right so as to lock the rotor in position with the passage 13 communicating with inlet port 11B.

Figure 2E:
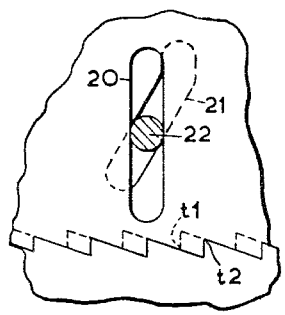
Figure 2F:
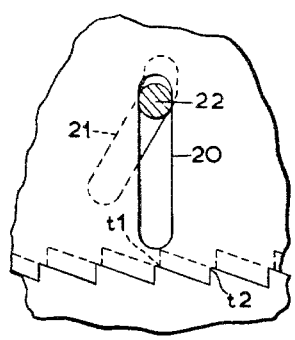

FIGS. 2E and 2F show how the drive sleeve 16 returns to its original position when the rotor is allowed to return to its original position upon release of the fluid pressure applied to the outlet port 12.

In a modification of the invention only the rotor 14 is enclosed in a cylindrical housing provided with ports, the driving mechanism being disposed outside the housing proper and the rotor is coupled to the driving mechanism by a shaft extending through the cylindrical housing.

Figure 3:
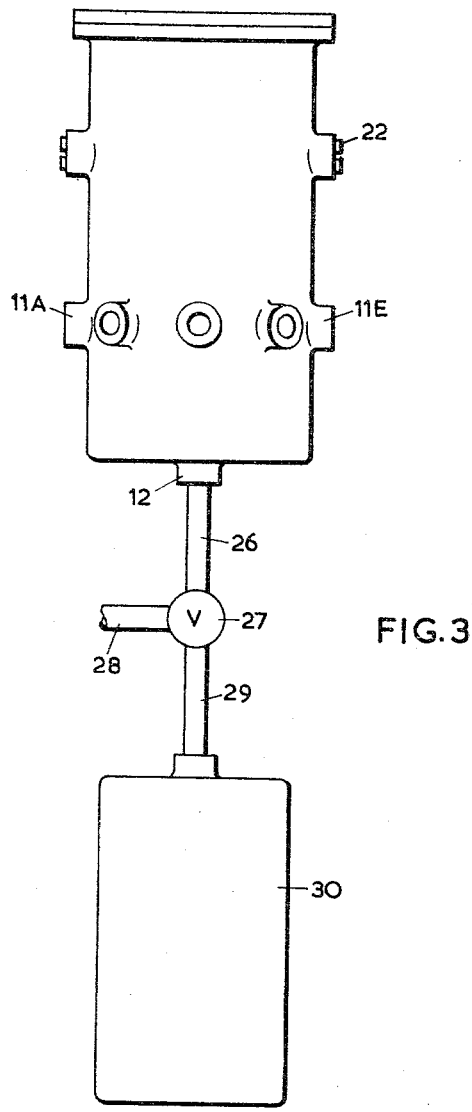
FIG. 3 is a general view of the valve as it is connected with other apparatus for operating the valve.

FIG. 3 shows the valve of FIGS. 1 and 2 connected for operation with the input ports 11A to 11H connected to input supply lines (not shown) one of which thus connects with the outlet port 12 through the rotor passage. The outlet port is connected to a line 26 from which the valve outlet is taken through a further valve 27 which connects the line 26 to a further line 28 and which cuts off the line 29 from the lines 26 and 28.

When it is desired to change the path between the outlet port and any of the inlet ports the valve 27 is turned to close the connection between the lines 26 and 28 and establish a connection between the lines 26 and 29 so that gas under pressure is supplied from a container 30 to the outlet valve to operate the valve in the manner previously described. When the valve 27 is turned back to establish connection between the lines 26 and 28 the gas pressure is removed from the inlet port and any of the gas in the valve exhausted through line 28.

What I claim as my invention and desire to secure by Letters Patent is:

1. A selector valve comprising, in combination, a housing having a number of inlet ports disposed circumferentially about the housing and having an outlet port, a rotor mounted in the housing and having a passage therein communicating with the outlet port at one end and arranged for selectively communicating with any of the inlet ports at its other end, said rotor being mounted for rotary movement and for axial movement between a first position wherein said passage is aligned with the inlet ports and a second position wherein said passage is out of alignment with the inlet ports, biasing means for biasing the rotor to said first position, an abutment surface on the rotor, a fluid-pressure reaction surface on the rotor adjacent said one end of said passage, a normally-open non-return valve in said passage having a closed position in which it prevents reverse fluid flow from the outlet port through said passage, the non-return valve in its closed position abutting said abutment surface and being movable to its closed position by pressure of fluid admitted to the outlet port, and driving means operatively associated with the rotor for rotating the rotor through a predetermined angle in response to a temporary axial displacement thereof to said second position resulting from the pressure of said fluid temporarily admitted to the outlet port so that said passage can be caused to communicate with a desired inlet port.

2. A selector valve according to claim 1 in which the driving means is adapted to rotate the rotor to cause said passage to communicate with the next adjacent inlet port upon each single admission of the fluid to the outlet port.

3. A selector valve according to claim 1 in which the driving means includes locking means for locking the rotor in position with the said other end of said passage communicating with an inlet port.

4. A selector valve comprising, in combination, a housing having a number of inlet ports disposed circumferentially about the housing and having an outlet port, a rotor mounted in the housing and having a passage therein communicating with the outlet port at one end and arranged for selectively communicating with any of the inlet ports at its other end, said rotor being mounted for rotary movement and for axial movement between a first position wherein said passage is aligned with the inlet ports and a second position wherein said passage is out of alignment with the inlet ports, biasing means for biasing the rotor to said first position, an abutment surface on the rotor, a fluid-pressure reaction surface on the rotor adjacent said one end of said passage, a normally-open non-return valve in said passage having a closed position in which it prevents reverse fluid flow from the outlet port through said passage, the non-return valve in its closed position abutting said abutment surface and being movable to its closed position by pressure of fluid admitted to the outlet port, and driving means mounted for limited rotary and axial movement within the housing and operatively associated with the rotor for rotating the rotor through a predetermined angle in response to each temporary axial displacement of the driving means imparted by a corresponding temporary axial displacement of the rotor to said second position resulting from the pressure of the fluid admitted to the outlet port so that said passage can be caused to communicate with a desired inlet port.

5. A selector valve according to claim 4, in which the driving means is adapted to rotate the rotor to cause said passage to communicate with the next adjacent inlet port upon each single admission of the fluid to the outlet port.

6. A selector valve according to claim 4, in which the driving means includes locking means for locking the rotor in position with the said other end of said passage communicating with an inlet port.

7. A selector valve comprising, in combination, a housing having a number of inlet ports disposed circumferentially about the housing and having an outlet port, a rotor carrying a crown of teeth and mounted in the housing and having a passage therein communicating with the outlet port at one end and arranged for selectively communicating with any of the inlet ports at its other end, said rotor being mounted for rotary movement and for axial movement between a first position wherein said passage is aligned with the inlet ports and a second position wherein said passage is out of alignment with the inlet ports, biasing means for biasing the rotor to said first position, an abutment surface on the rotor, a fluid-pressure reaction surface on the rotor adjacent said one end of said passage, a normally-open non-return valve in said passage having a closed position in which it prevents reverse fluid flow from the outlet port through said passage, the non-return valve in its closed position abutting said abutment surface and being movable to its closed position by pressure of fluid admitted to the outlet port, and driving means operatively associated with the rotor including, a sleeve mounted for rotary movement through a predetermined angle in response to axial movement thereof and having a crown of teeth, and means for resiliently biasing the teeth of the sleeve into engagement with the rotor teeth so that the sleeve is rotated through the said predetermined angle in response to each temporary axial displacement of the rotor to said second position resulting from the pressure of fluid admitted to the outlet port whereby the rotor is rotated by the sleeve through the said predetermined angle so that said passage can be caused to communicate with a desired inlet port.

8. A selector valve according to claim 7, in which the driving means is adapted to rotate the rotor to cause said passage to communicate with the next adjacent inlet port upon each single admission of the fluid to the outlet port.

9. A selector valve according to claim 7, in which the driving means includes locking means for locking the rotor in position with the said other end of said passage communicating with an inlet port.

10. A selector valve comprising, in combination, a cylindrical housing having end walls, a number of inlet ports disposed circumferentially about the housing, an outlet port disposed in one said end wall, a rotor carrying a crown of teeth and mounted in the housing and having a passage therein communicating with the outlet port at one end and arranged for selectively communicating with any of the inlet ports at its other end, said rotor being mounted for rotary movement and for axial movement between a first position wherein said passage is aligned with the inlet ports and a second position wherein said passage is out of alignment with the inlet ports, an abutment surface on the rotor, a fluid-pressure reaction surface on the rotor adjacent said one end of said passage, a normally-open non-return valve in said passage having a closed position in which it prevents reverse fluid flow from the outlet port through said passage, the non-return valve in its closed position abutting said abutment surface and being movable to its closed position by pressure of fluid admitted to the outlet port, and driving means mounted within the housing and including a sleeve having a crown of teeth co-operating with the rotor teeth and guide means carried by the housing and operatively associated with the sleeve for causing the sleeve to rotate through a predetermined angle in response to axial movement thereof, and means for resiliently biasing the teeth on the sleeve into engagement with the rotor teeth so that the sleeve is rotated through the said predetermined angle in response to each temporary axial displacement of the rotor resulting from the pressure of the fluid admitted to the outlet port whereby the rotor is rotated by the sleeve through the said predetermined angle so that said passage can be caused to communicate with a desired inlet port.

11. A selector valve according to claim 10, including a second sleeve operatively associated with the guide means to be guided for axial movement thereby, a crown of teeth on the second sleeve, and means for resiliently biasing the teeth of the second sleeve into engagement with the rotor teeth whereby the second sleeve retains the rotor in its rotational position after each rotary movement of the rotor resulting from the temporary displacement thereof to said second position.

References Cited by the Examiner
UNITED STATES PATENTS

| | | | |
|---|---|---|---|
| 2,678,845 | 5/1954 | Fitter | 137—624.14 X |
| 2,870,788 | 1/1959 | Hull | 137—625.16 X |

ISADOR WEIL, *Primary Examiner.*